Dec. 20, 1966    A. L. WILLIAMS ETAL    3,293,401
METHODS OF AND APPARATUS FOR JOINING METAL STRIP
Filed Oct. 12, 1962    11 Sheets-Sheet 6

INVENTORS
ARTHUR L. WILLIAMS
and FRANCIS A. BODENHEIM
By Williams and Kreske
ATTORNEYS

Dec. 20, 1966  A. L. WILLIAMS ETAL  3,293,401
METHODS OF AND APPARATUS FOR JOINING METAL STRIP
Filed Oct. 12, 1962  11 Sheets-Sheet 7

INVENTORS
ARTHUR L. WILLIAMS
and FRANCIS A. BODENHEIM
By Williams and Kiszke
ATTORNEYS Dec. 20, 1966     A. L. WILLIAMS ETAL     3,293,401
METHODS OF AND APPARATUS FOR JOINING METAL STRIP
Filed Oct. 12, 1962     11 Sheets-Sheet 10

Fig. 13

INVENTORS
ARTHUR L. WILLIAMS
and FRANCIS A. BODENHEIM
By Williams and Kreske
ATTORNEYS Dec. 20, 1966   A. L. WILLIAMS ETAL   3,293,401
METHODS OF AND APPARATUS FOR JOINING METAL STRIP
Filed Oct. 12, 1962   11 Sheets-Sheet 11

Fig. 14

INVENTORS
ARTHUR L. WILLIAMS
and FRANCIS A. BODENHEIM
By Williams and Kreske
ATTORNEYS United States Patent Office 3,293,401
Patented Dec. 20, 1966

3,293,401
METHODS OF AND APPARATUS FOR
JOINING METAL STRIP
Arthur L. Williams and Francis A. Bodenheim, Warren, Ohio, assignors, by mesne assignments, to The McKay Machine Company, a corporation of Ohio
Filed Oct. 12, 1962, Ser. No. 230,043
16 Claims. (Cl. 219—97)

The present invention relates to the joinder of metal strip in end-to-end relation, more particularly to methods of and apparatus for joining such metal strip, and the principal object of the invention is to provide new and improved methods and apparatus of such character.

Many strip processing lines required the uninterrupted, continuous flow of strip thereto and since strip is, of course, available only in finite lengths, it is necessary to join the trailing end of each strip length to the leading end of another strip length to form a continuous strip. Since most, if not all, strip end joinder operations require immobilization of the strip ends, it is of vital importance that the joinder operation be completed in an absolute minimum time interval so that strip travel can be re-established with as little delay as possible.

One very practical mode of strip joinder has been flash welding wherein high-density electrical energy is passed between the strip ends to be joined until they soften and such ends are then forced together and held until they harden. Unfortunately, however, in forcing the strip ends together, softened metal is upset to project transversely of the strip ends thus necessitating some sort of a trimming operation to remove such projecting metal or flash.

In most prior-art strip flash welders, the welded juncture of the strip ends is advanced longitudinally of the strip from the position at which it was welded and then gripped tightly between suitable jaws while a suitable tool traverses the joint to trim the latter to approximately single strip thickness.

The present invention is a marked advance over prior-art, strip flash welders in that the joint between the welded strip ends is trimmed in situ while it remains gripped in the same jaws which held it for the welding operation. This results in a reduction in the overall size of the apparatus required to weld and trim the strip and a considerable decrease in total time required for such operations. These and other advantages will readily become apparent from a study of the following description and from the drawings appended hereto.

In the drawings accompanying this specification and forming a part of this application there is shown, for purpose of illustration, an embodiment which the invention may assume, and in these drawings.

Figure 1:
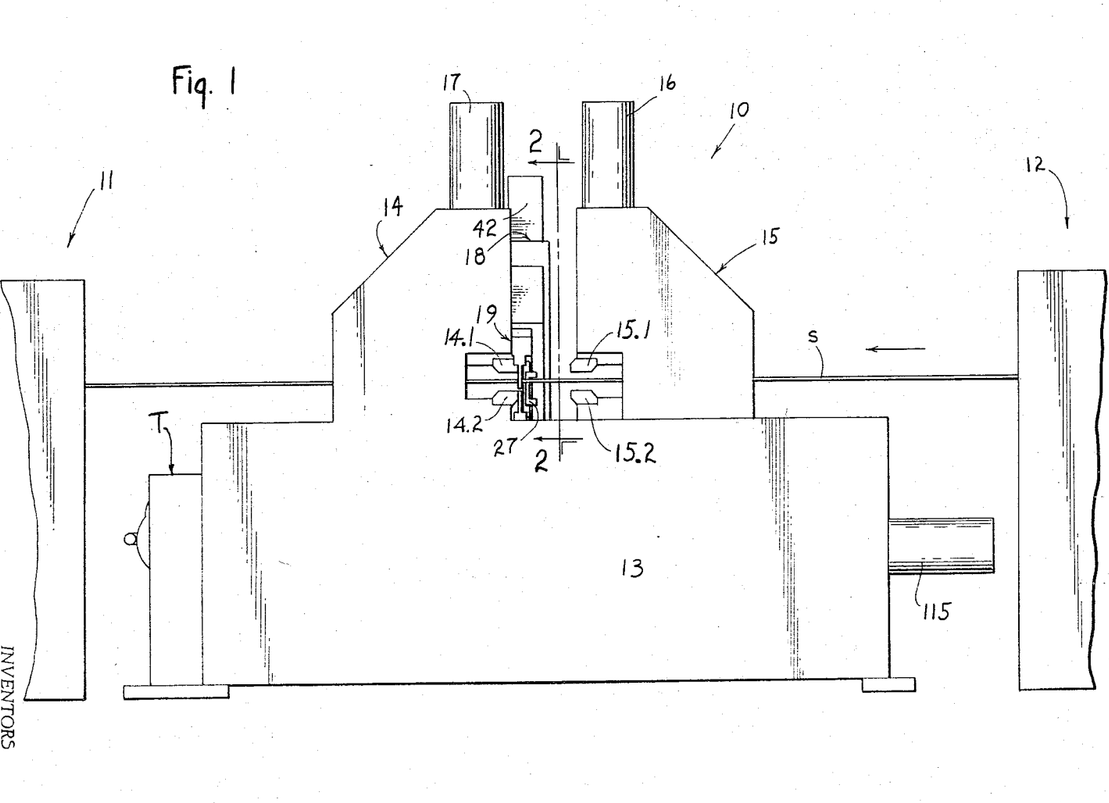
FIGURE 1 is a front elevational view of apparatus embodying the present invention.

With reference to FIGURE 1, apparatus 10 embodying the present invention is shown disposed at the entry end of a strip processing line 11 and intermediate the latter and a strip dispensing device 12 such as a pay-off reel. In the position of parts shown, strip S travels longitudinally in the direction of the arrow from the device 12, through apparatus 10 to the line 11. At this time, apparatus 10 is in stand-by position with the strip merely passing freely therethrough until the supply of coiled strip being delivered by device 12 is exhausted. Thereafter, the trailing end of strip S will be stopped within apparatus 10, the leading end of another coil of strip will be fed into the apparatus, the strip ends will be welded together in end-to-end relation by the apparatus, and the strip will then be permitted to once again freely move through the again inactive apparatus 10 to the processing line 11.

Turning now to the more specific construction of apparatus 10, and still referring to FIGURE 1, the apparatus is herein illustrated as comprising a base 13 having a fixed, upstanding housing portion 14 and an upstanding housing portion or slide 15 carried by the base 13 for sidewise movement toward and away from the fixed housing portion 14 in a direction longitudinally of the strip. A fluid cylinder 115 or the like may be carried by the base 13 and connected to the housing portion 15 for effecting the movement aforesaid.

Carried by the housing portion 15 and movable therewith are a pair of clamping jaws comprising of an upper jaw 15.1 and a lower jaw 15.2 which extend transversely of the strip. Clamp jaw 15.2 is presently shown as being fixed against vertical movement while clamp jaw 15.1 is movable vertically toward and away from lower jaw 15.2 by means of a fluid cylinder or the like 16 to grip the strip between the pair of jaws.

Similarly, housing portion 14 carries a pair of jaws 14.1, 14.2, the upper jaw 14.1 being shiftable vertically toward and away from the fixed lower jaw 14.2 by means of a fluid cylinder or the like 17. It will be noted that in the stand-by position of parts seen in FIGURE 1, the jaws of each jaw pair are separated, the strip S passing freely therebetween as illustrated. Also, and for reasons later to appear, all of the clamping jaws are electrically insulated from the parts on which they are supported by the usual insulating material. A transformer T is carried by the base 13 and is electrically connected to the jaw pair 14.1, 14.2 and the jaw pair 15.1, 15.2 in the usual manner.

Figure 2:
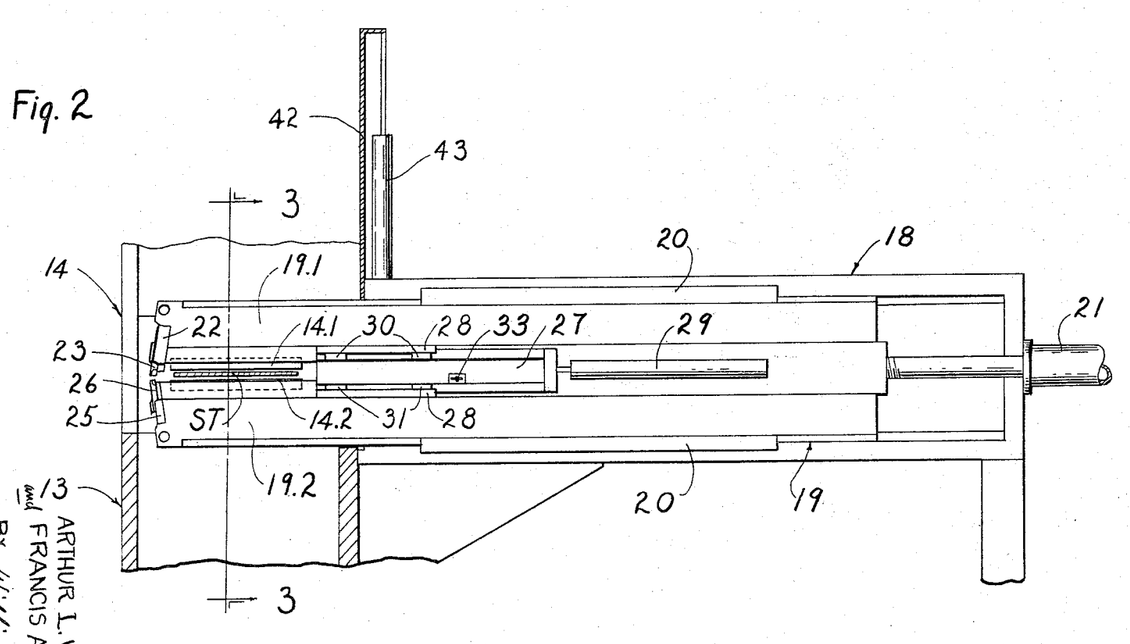
FIGURE 2 is a fragmentary sectional view generally corresponding to the line 2—2 of FIGURE 1.

Projecting rearwardly of the base 13 and with reference to FIGURE 2, there is provided an elongated frame 18 which is welded or otherwise suitably secured to the base. Frame 18 supports a slide 19 (see also FIGURE 3) which may also be termed a second slide and which is guided for movement adjacent the previously mentioned jaw pairs in a direction edgewise of the strip by suitable gibs 20. The left end of slide 19 is bifurcated to provide spaced, upper and lower arms 19.1, 19.2 respectively disposed above and below the pass line of the strip. A double acting fluid cylinder or the like 21 is carried by the frame 18 and is connected to the slide 19 to effect reciprocation thereof along its gibs.

Figure 4:
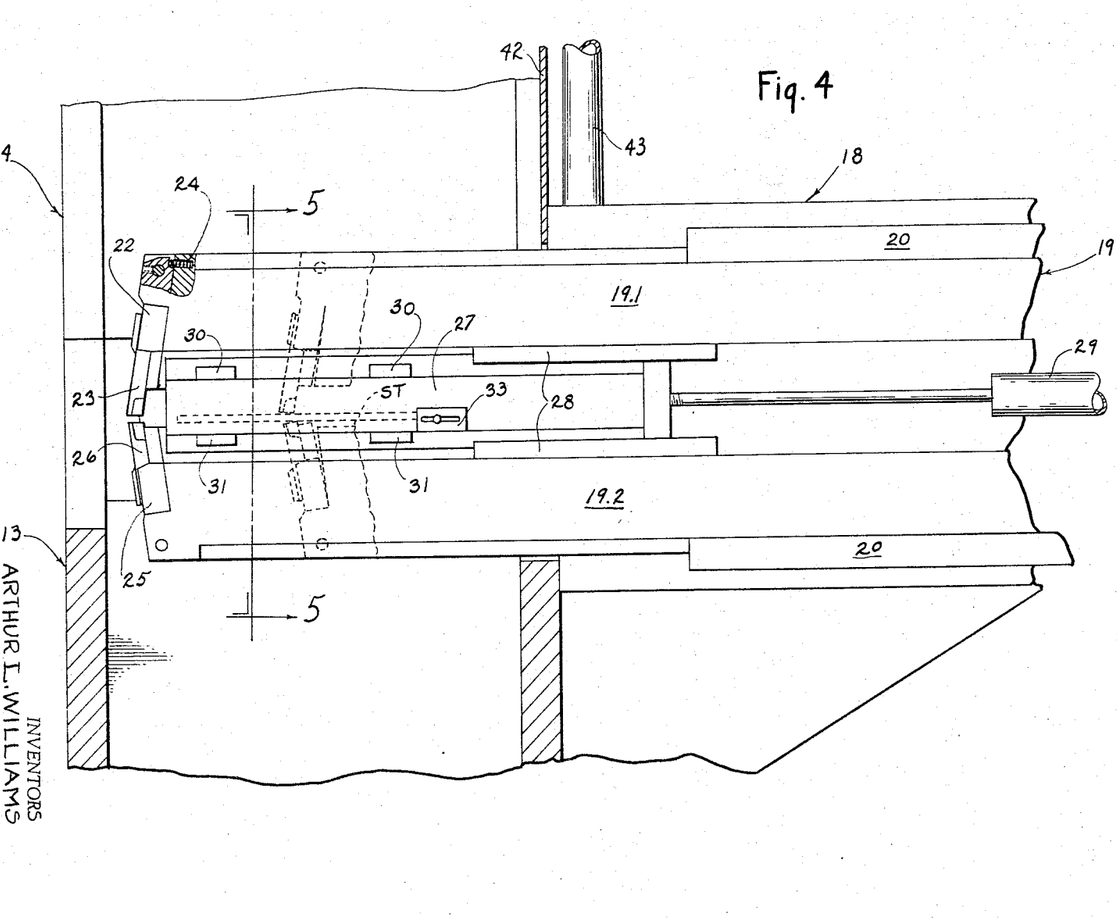
FIGURE 4 is an enlarged fragmentary view similar to FIGURE 2 but with certain parts shown in another position.

Pivotally carried by the free end of slide arm 19.1 and with particular reference to FIGURE 4 is a depending support 22 carrying a knife 23 which fits between the jaw pair 14.1, 14.2 and the jaw pair 15.1, 15.2 for a purpose to appear. A spring or the like 24 yieldably retains the support 22 in the full-line position illustrated. Similarly, an upstanding support 25 carrying a knife 26 is pivotally carried by the free end of slide arm 19.2. Although not shown, knife support 25 may be yieldably retained in the full-line position illustrated by means of a spring similar to the previously mentioned spring 24.

Figure 3:
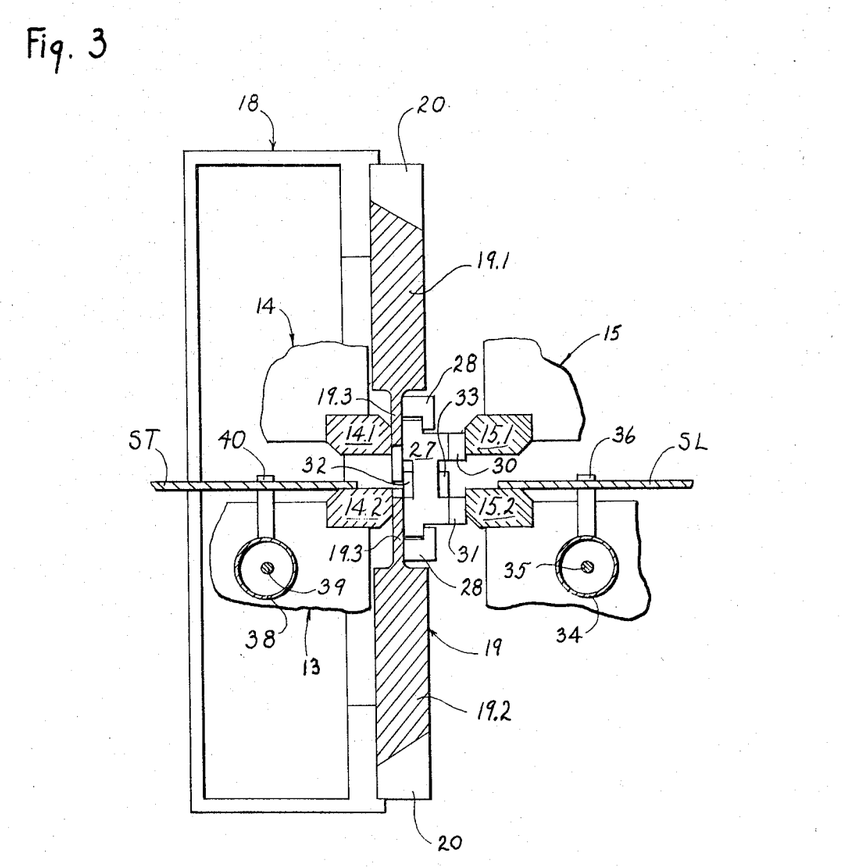
FIGURE 3 is an enlarged sectional view generally corresponding to the line 3—3 of FIGURE 2, certain parts being shown but fragmentarily in the interest of clarity.

As best seen in FIGURE 3, slide 19 is reduced in thickness at 19.3 for sliding engagement with the jaws 14.1, 14.2. The opposite, or right-hand side of slide portion 19.3 slidably supports a gauge bar 27 which is guided for movement in the same plane as slide 19 by means of suitable gibs 28. A suitable fluid cylinder or the like 29 (FIGURE 2) is carried by the slide 19 and is connected to the gauge bar to effect movement thereof from the position shown in FIGURE 2 wherein it is to one side of the strip pass line to the position seen in FIGURE 4 wherein it is disposed across the strip pass line. Since gauge bar 27 is carried by the slide 19, it is, of course, reciprocable therewith in addition to being reciprocable with respect thereto.

For a purpose to appear and as best seen in FIGURES 3 and 4, gauge bar 27 carries spacer blocks 30 and 31 for sliding engagement with the jaws 15.1, 15.2 respectively in the position in which they are shown in FIGURE 3. Bar 27 also carries strip edge abutments 32, 33 on opposite sides thereof (FIGURE 6), abutment 32 preferably being unmovably secured to the bar while abutment 33 is adjustable longitudinally of the bar by means of a screw and slot arrangement (FIGURE 4).

Figure 6:
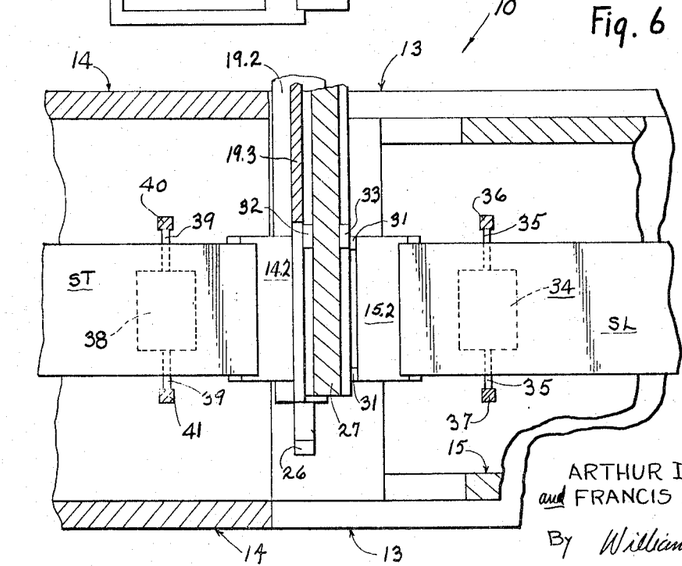
FIGURE 6 is a fragmentary view generally corresponding to the line 6—6 of FIGURE 5, FIGURES 7 and 8 are views similar to FIGURE 6 but with certain parts shown in other positions.

Means are provided for shifting the leading and trailing strip ends in an edgewise direction to insure proper edge-alignment thereof for welding and as best seen in FIGURES 3 and 6, movable housing portion 15 supports a fluid cylinder 34 whose axis extends in an edgewise direction of the strip and which is disposed below the pass line of the latter. Cylinder 34 has a piston rod 35 projecting outwardly of its ends and secured to the free ends of the piston rod are upstanding fingers 36 and 37 which project above the strip pass line but which are normally disposed in spaced relation from respective strip edges. A similar fluid cylinder 38 having a piston rod 39 and upstanding fingers 40 and 41 is carried by the fixed housing portion 14.

Figure 11:
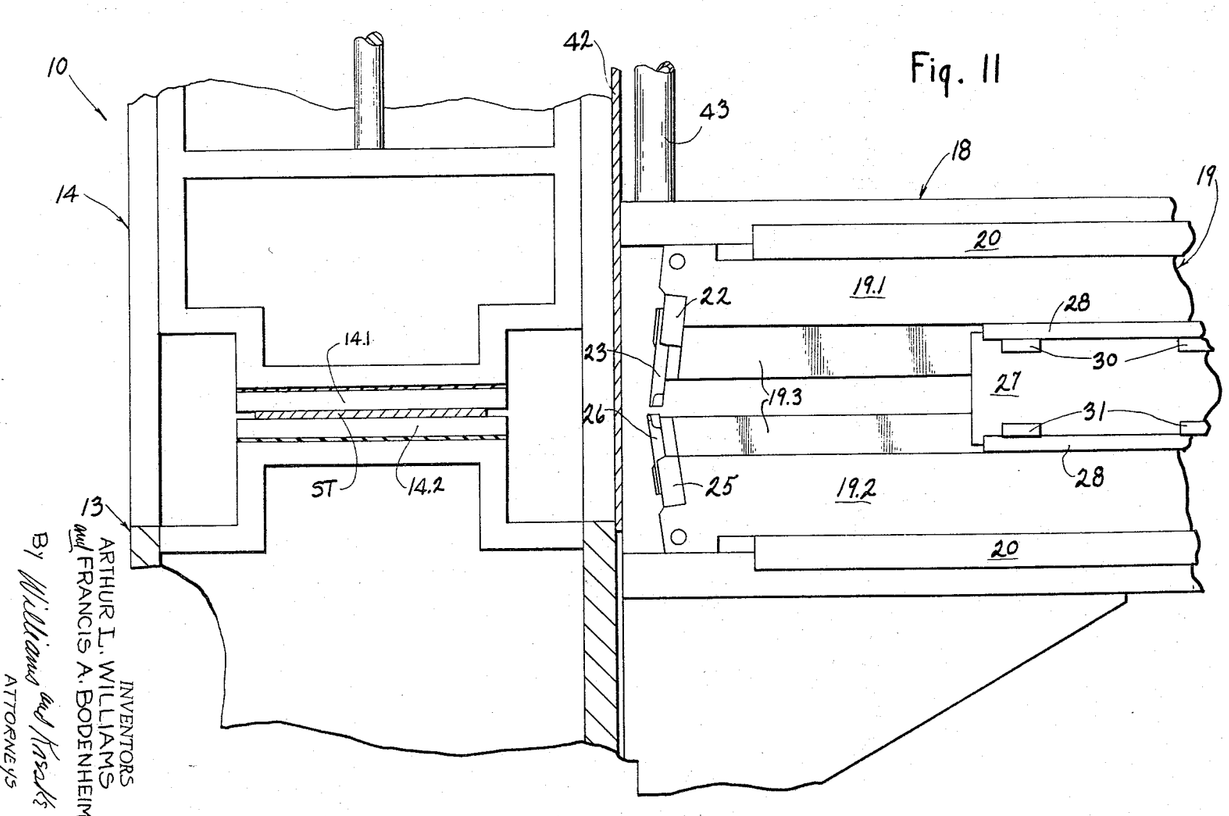
FIGURE 11 is a view similar to FIGURE 4 but showing certain parts in other positions.

As earlier mentioned, slide 19 is adapted to be reciprocated in a direction edgewise of the strip by means of the fluid cylinder 21 and with reference to FIGURES 4 and 11 wherein the slide is seen in its two extreme positions, a sheet metal or the like plate or shield 42 is suitably guided for vertical movement across the path of the slide 19. To effect vertical movement of the shield 42, a fluid cylinder 43 may be supported by the slide frame 18 with its piston rod connected to the shield as illustrated in FIGURE 2.

In the position of parts seen in FIGURE 2, shield 42 is shown elevated above the path of movement of slide 19 wherein it does not interfere with reciprocation thereof while in the position of parts seen in FIGURE 11, the shield is shown lowered across the path of movement of the slide and intermediate the latter and the strip clamping jaws to protect the slide and the parts carried thereby from the weld spatter which normally occurs during a flash-welding operation.

Figure 5:
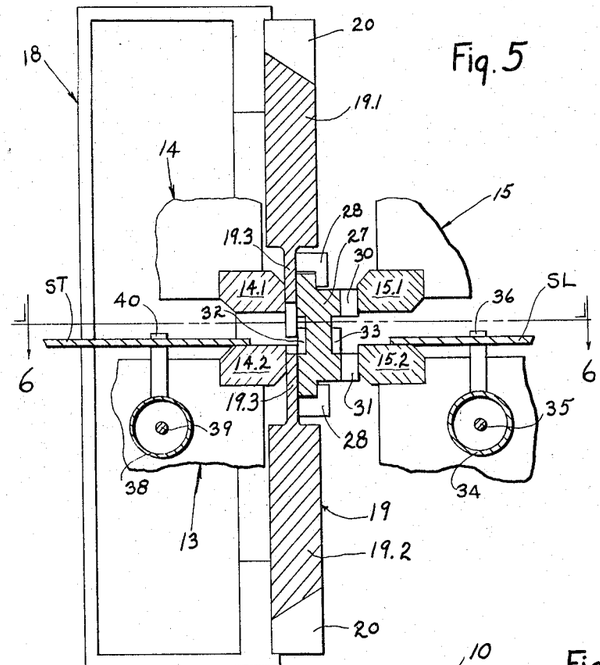
FIGURE 5 is a sectional view generally corresponding to the line 5—5 of FIGURE 4.

As previously mentioned, FIGURES 1 and 2 illustrate the stand-by phase of the apparatus 10, the strip S at this time traveling longitudinally in the direction of the arrow in FIGURE 1 from device 12 to the processing line 11, the strip passing freely between the open jaws 14.1, 14.2 and 15.1, 15.2 of the apparatus 10. When the strip being dispensed by device 12 is exhausted, the trailing end ST thereof (FIGURE 3) will be stopped slightly beyond the righthand edge of the clamping jaws 14.1, 14.2. The leading end SL of another length of strip will then be advanced to the position seen in FIGURE 3, just short of the left-hand edge of the clamping jaws 15.1, 15.2. Next, cylinder 29 will be actuated to shift the gauge bar 27 from the position seen in FIGURE 2 to the position seen in FIGURES 4, 5 and 6 wherein it projects across the normal path of strip travel and is disposed between the strip ends ST, SL.

Figure 7:
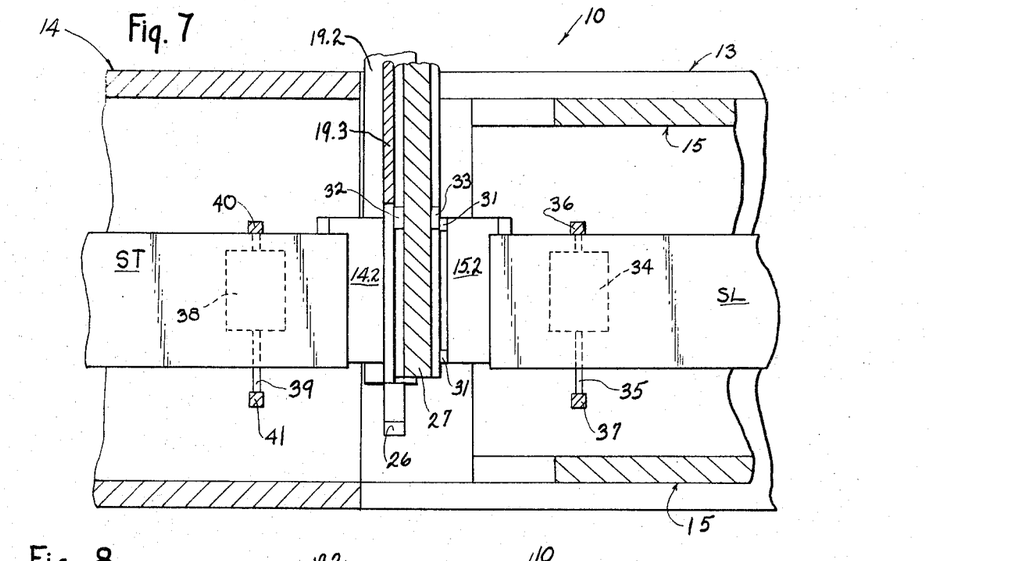
Figure 8:
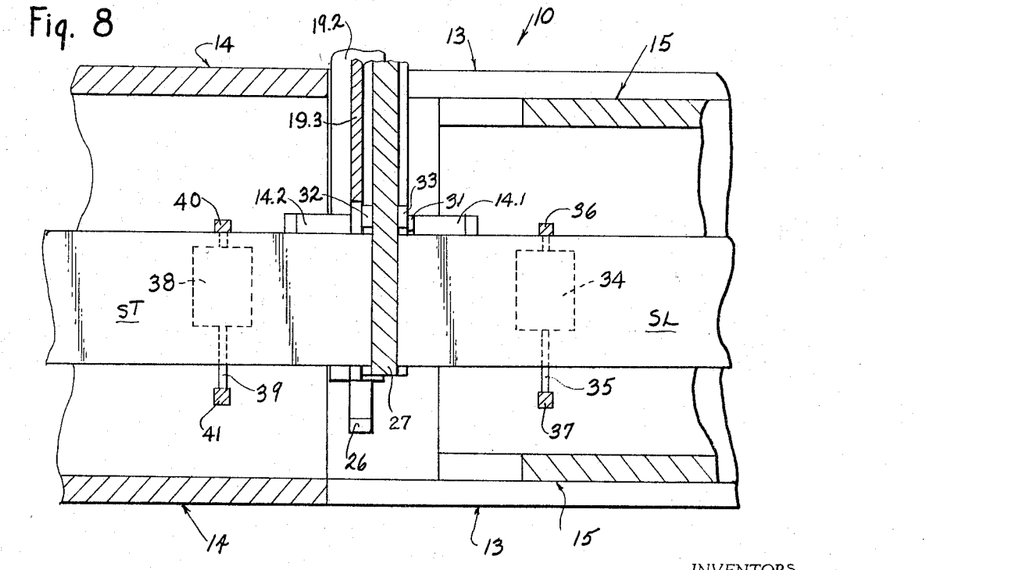
Figure 9:
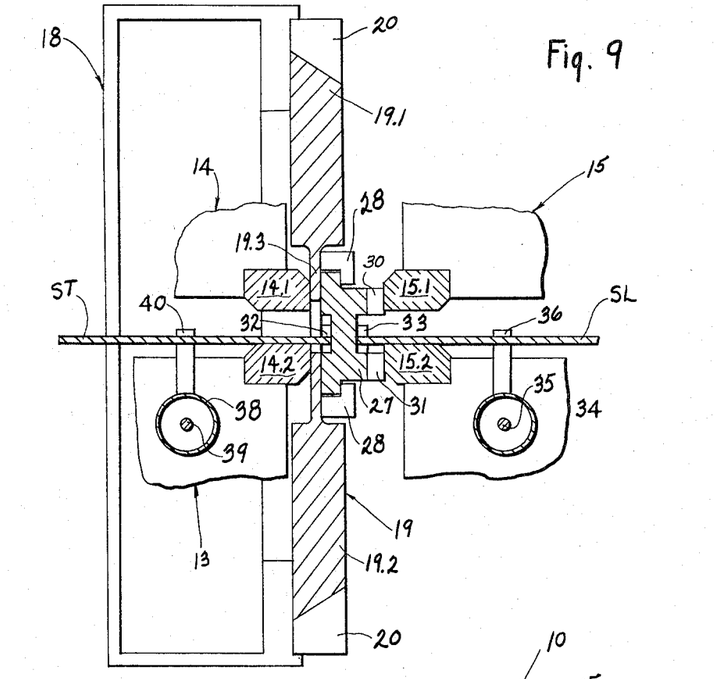
FIGURE 9 is a view similar to FIGURE 5 but showing the workpieces in the same positions in which they are seen in FIGURE 8.
Figure 10:
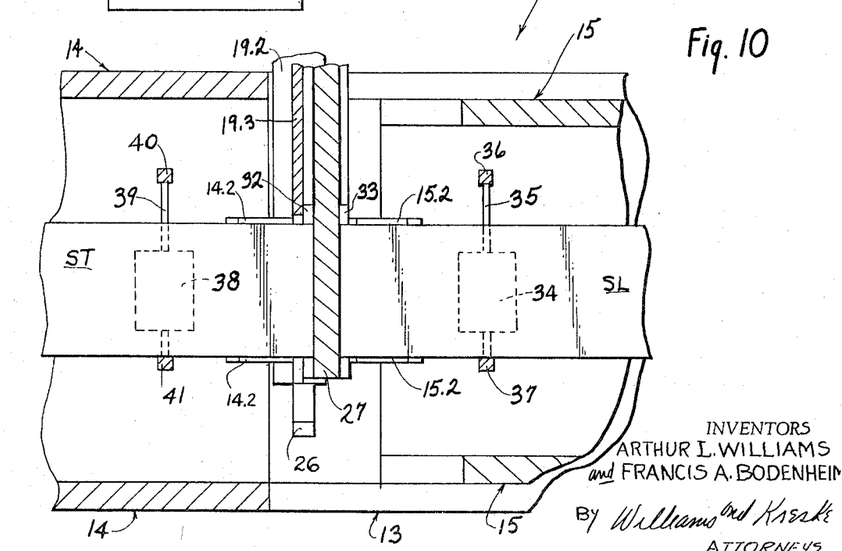
FIGURE 10 is a view similar to FIGURE 8 but showing certain parts in other positions.

The strip shifting cylinders 34 and 38 will next be actuated to cause the fingers 36, 40 to shift respective strip ends, if necessary, to the positions seen in FIGURE 7 to insure that they are to one side of respective strip edge abutments 32, 33. Next, the strip ends will be advanced toward each other to abutment with respective sides of the gauge bar 27 as seen in FIGURES 8 and 9. Although not shown, advancement of the strip ends may be effectuated by suitable pinch rolls or the like engaged with respective strip ends. The cylinders 34, 38 will now be actuated to cause their fingers 37, 41 to shift respective strip ends against respective strip edge abutments 32, 33 as illustrated in FIGURE 10. Note that the strip ends ST and SL are at this time precisely spaced apart by virtue of their abutment with the gauge bar 27 and the strip end edges adjacent the abutments 32, 33 are in precise alignment with each other.

Figure 12:
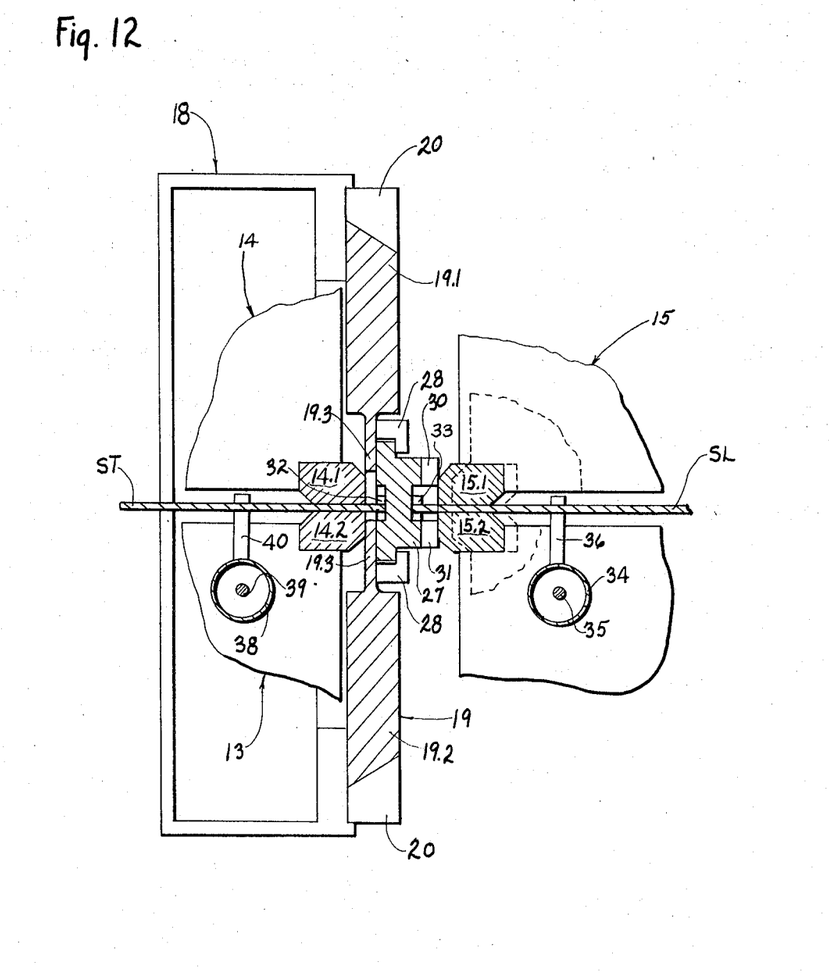
FIGURES 12, 13 and 14 are views similar to FIGURE 9 but showing certain parts in other positions.

Cylinders 16, 17 will now be actuated to lower respective movable clamping jaws 15.1, 14.1 to tightly grip the strip ends as illustrated in FIGURE 12. With the strip ends ST, SL tightly gripped, the housing portion 15 will be shifted by means of its cylinder 115 to slightly separate the jaw pair 15.1, 15.2 from the jaw pair 14.1, 14.2 as shown in phantom in FIGURE 12. The slide 19 will now be retracted by its cylinder 21 to the position seen in FIGURE 11. Substantially simultaneously, gauge bar 27 may also be retracted relative to the slide to return it to the position shown. As the slide 19 is shifted from the position seen in FIGURE 4 to that seen in FIGURE 11, knife supports 22, 25 will rock about their pivots slightly, as seen in phantom in FIGURE 4, as the knives pass over the strip end ST. Following disposition of the slide in the position illustrated in FIGURE 11, shield 42 will be lowered by its cylinder 43 to the position shown wherein the slide and all of its associated parts are shielded from the strip clamping jaws.

Figure 13:
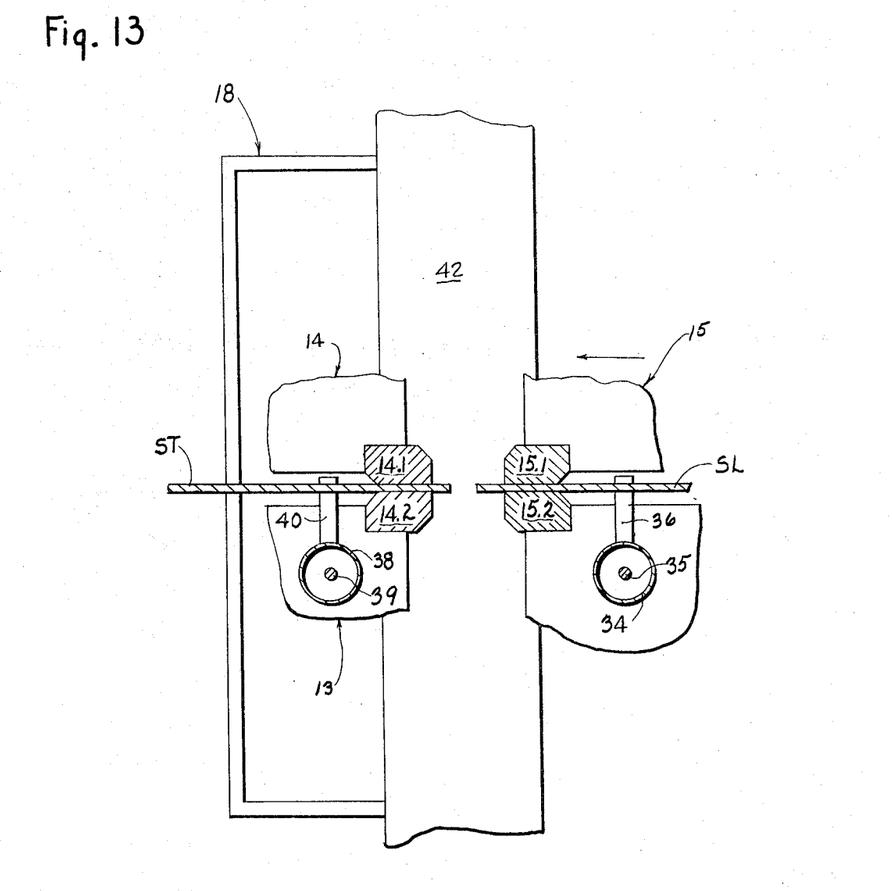
Figure 14:
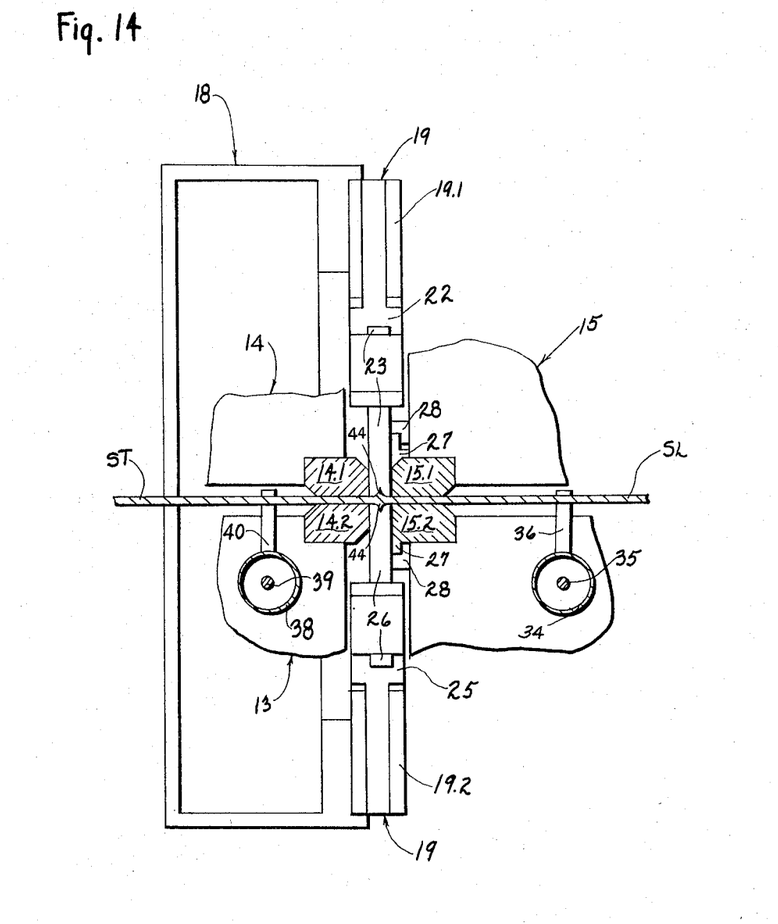

With the slide 19 retracted as above described, the housing portion 15 will be shifted by its cylinder 115 to move the jaw pair 15.1, 15.2 and the leading strip end SL clamped thereby in the direction of the arrow from the position illustrated in FIGURE 13 until such strip end is close enough to strip end ST for welding current to be passed therebetween. Welding current from transformer T will now be fed to the jaw pairs 14.1, 14.2 and 15.1, 15.2 to cause such current to pass between the strip ends. The passage of current between the strip ends will cause them to be very quickly heated to welding temperature whereupon the welding current will be cut off and the jaw pair 15.1, 15.2 further moved in the direction of the arrow to force the strip ends together into end-to-end, intimate relation as seen in FIGURE 14.

Almost immediately, the forced-together strip ends will fuse together leaving transversely projecting portions 44 of upset metal on each side of the joint. After the welding operation, shield 42 will once again be elevated to the position seen in FIGURES 2 and 4 and upon hardening of the fused-together strip ends, slide 19 will be advanced from the position shown in FIGURE 11 to that shown in FIGURES 2 and 4.

As the slide advances, the knives 23, 26 will traverse the joint of the strip ends between the still closed pairs of strip clamping jaws to trim off the upset metal portions 44 substantially flush with respective upper and lower strip bases. It is to be noted (FIGURE 14) that the width of the knives 23, 26 is such as to just fit between the jaw pairs 14.1, 14.2 and 15.1, 15.2 when they are in their closest position at the completion of the welding operation. Accordingly, as the knives traverse the line of weld to trim off the upset metal, they side between the pairs of clamping jaws to remove from their adjoining faces any splattered metal which may adhere to them as a result of the welding operation.

Following disposition of the slide 19 in the position seen in FIGURE 2, the now welded-together and trimmed strip ends will be released by raising the jaws 14.1, 15.1 to thus permit a resumption of strip travel in the direction indicated in FIGURE 1. Housing 15 may now be returned to the position seen in FIGURES 1 and 3, the apparatus 10 now being in stand-by once again until another weld is required.

In view of the foregoing, it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that our invention is not limited thereto.

We claim:

1. The method of joining a pair of metal strip ends together in end-to-end relation which comprises moving a gauge bar between two pair of clamping jaws, shifting the strip ends between respective pair of jaws and in abutment with respective opposed sides of the gauge bar, clamping the strip ends between respective jaw pairs, withdrawing said gauge bar in a direction edgewise of the strip ends from between said clamping jaw pairs and also shifting a cutting tool in a direction edgewise of the strip ends from one side of the strip ends and positioning both said bar and said tool on the other side of the strip ends and in spaced relation therefrom, positioning a shield between said cutting tool and the strip ends, passing current between the strip ends to raise them to welding temperature, relatively moving the jaw pairs toward each other to press the heat-softened strip ends together and then holding said pairs of jaws immobilized while the heat-fused strip ends cool and harden, shifting said shield from between said cutting tool and the strips ends, moving said cutting tool between said immobilized pairs of jaws and along the line of strip end juncture to remove transversely projecting portions of metal upset by movement aforesaid of the jaw pairs toward each other, and opening said pairs of jaws to release the joined strip ends.

2. The method of joining a pair of metal strip ends together in end-to-end relation which comprises moving a gauge bar between two pair of clamping jaws, shifting the strip ends in a longitudinal direction to abutment with respective opposed sides of said gauge bar and between respective pairs of jaws, shifting both of the strip ends while in abutting relation with said gauge bar in an edgewise direction to abutment with respective edge guide members which are aligned with each other along a path parallel to the line of strip travel to thereby insure longitudinal alignment of those strip edges in abutment with said edge guide member, clamping the strip ends between respective jaw pairs, removing said gauge bar from position between said strip ends, passing welding current between the strip ends to raise them to welding temperature, relatively moving the jaw pairs toward each other to press the heat-softened strip ends together and then holding said pairs of jaws immobilized while the head-fused ends cool and harden, and opening said pairs of jaws to release the joined strip ends.

3. The method of claim 2 and further comprising the step of moving a cutting tool between the immobilized pairs of jaws and along the line of strip end juncture immediately before opening said pairs of jaws to remove transversely projecting portions of metal upset by movement aforesaid of said jaw pairs toward each other.

4. The method of joining a pair of metal strip ends together in end-to-end relation which comprises moving a gauge bar between two pair of clamping jaws, shifting the strip ends in an edgewise direction away from respective edge guide members which are aligned with each other along a path parallel to the line of strip travel, shifting the strip ends in a longitudinal direction to abutment with respective opposed sides of said gauge bar and between respective pairs of jaws, shifting the strip ends while in abutting relation with said gauge bar in an opposite edgewise direction to abutment with said respective edge guide members to thereby insure longitudinal alignment of those strip edges which are in abutment with said edge guide members, clamping the strip ends between respective jaw pairs, removing said gauge bar from position between said strip ends, passing welding current between the strip ends to raise them to welding temperature, relatively moving the jaw pairs toward each other to press the heat-softened strip ends together and then holding said pairs of jaws immobilized while the heat-fused ends cool and harden, and opening said pairs of jaws to release the joined strip ends.

5. The method of joining a pair of metal strip ends together in end-to-end relation which comprises shifting a carriage in a direction edgewise of the strip ends from one side of the latter to position a gauge bar between the strip ends to be joined, clamping said strip ends between respective clamping jaws with respective strip ends abutting said gauge bar, shifting said carriage edgewise of said strip ends and in the opposite direction to return said carriage and said gauge bar to said one strip end side, passing welding current between said strip ends to raise them to welding temperature, relatively moving said pairs of jaws toward each other to press the heat-softened strip ends together, holding said pairs of jaws immobilized while the heat-fused strip ends cool and harden, shifting said carriage from said one side and in the direction first mentioned once again while retaining said gauge bar on said one side and thereby causing a cutting device mounted on said carriage to traverse the line of weld between said immobilized pairs of jaws for removing transversely projecting portions of metal resulting from the welding operation, and opening said pairs of jaws to release the joined strip ends.

6. Apparatus for welding the ends of metal strip together in end-to-end relation comprising two pair of jaws for gripping respective strip ends therebetween in spaced-apart relation and relatively movable toward each other to abut such strip ends and thereby provide for welding one to the other between said pairs of jaws, a carriage movable longitudinally of the line of weld joining said strip ends, tool means mounted on said carriage and aligned with said line of weld between said pairs of jaws to remove transversely projecting portions of metal at the line of weld resulting from the welding operation upon carriage movement in one direction, a gauge bar mounted on and movable with said carriage and in one position of said carriage and said bar the latter being disposed between said pairs of jaws for abutment with said strip ends to establish a predetermined spacing between the latter, and means for shifting said gauge bar relative to said carriage to a position spaced from between said pairs of jaws when said carriage is in said one position.

7. The construction of claim 6 wherein said carriage has a pair of arms coextending therefrom in spaced, side-by-side relation between which the strip ends are disposed when said carriage is in said one position, and wherein said tool means comprises a pair of cutting tools each carried by a free end of a respective carriage arm aforesaid for engagement with respective sides of the line of weld joining said strip ends.

8. The construction of claim 7 wherein shield means is interposed between said pairs of jaws and said carriage when the latter is spaced from said one position to protect said carriage, said cutting tools and said gauge bar against weld spatter, and wherein said shield means is shiftable transversely of the path of movement of said carriage to provide for unimpeded movement of the latter to its aforesaid one position.

9. The construction of claim 8 wherein each cutting tool is pivoted to its carriage arm for movement away from said strip ends during carriage movement in said opposite direction.

10. Apparatus for welding the ends of metal strip together in end-to-end relation comprising two pair of jaws for gripping respective strip ends therebetween in spaced-apart relation and relatively movable toward each other to abut such strip ends and thereby provide for welding one to the other between said pairs of jaws, and a gauge bar movable edgewise of the strip ends along a rectilinear path aligned with the space between said strip ends from a first position at one side thereof to a second position between said pairs of jaws and said strip ends to establish a predetermined spacing between the latter.

11. The construction of claim 10 wherein shield means is interposed between said pairs of jaws and said gauge bar when the latter is in said first position to protect said gauge bar against weld spatter, and wherein said shield means is shiftable transversely of the path of movement of said gauge bar to provide for unimpeded movement of the latter from its aforesaid first position to its aforesaid second position.

12. Apparatus for welding the ends of metal strip together in end-to-end relation comprising two pairs of jaws for gripping respective strip ends therebetween in spaced-apart relation and relatively movable toward each other to abut such strip ends and thereby provide for welding one to the other between said pairs of jaws, a carriage movable longiutdinally of the line of weld joining said strip ends, tool means mounted on and movable with said carriage and aligned with said line of weld between said pairs of jaws, in a first position of said carriage said tool means being disposed on one side of said strip ends and in a second position of said carriage said tool means being disposed on the other side of said strip ends, said tool means traversing said line of weld during carriage movement from said first position to said second position to remove transversely projecting portions of metal at the line of weld resulting from the welding operation, and shield means interposed between said pairs of jaws and said tool means when said carriage is in said one position to protect said tool means and said carriage from weld spatter, said shield means being shiftable transversely of the path of movement of said carriage to provide for unimpeded movement of the latter from its aforesaid first position to its aforesaid second position.

13. In an electric resistance flash-butt wedding machine having a base, a first weld clamp having a current-conductive clamping die longitudinally fixed on said base, a second weld clamp having a current-conductive clamping die slidably mounted on said base for longitudinal movement toward and away from said first clamp, a slide mounted on said base for lateral movement thereon and mounting cutting tools to trim weld flash from opposite sides of welded stock held in said clamps, and a gauge bar retractably mounted on said slide and adapted to be moved into position between said dies to thereby control the positioning of the inner ends of workpieces moved into said clamps preparatory to the effecting of a weld therebetween and the consequent production of said stock.

14. In an electric resistance flash-butt welding machine having a base, a first welding clamp rigidly mounted on said base, a first slide movable sidewise on said base and mounting a second welding clamp, and means on said base to actuate said first slide; the improvement comprising a second slide mounted on said base rearwardly of said clamps and movable in forward and rearward directions, cutting tools mounted on the forward end of said second slide operative to trim weld flash and excess upset metal from welded stock held in said clamps and to clean off the inwardly directed faces of the dies of said clamps, and a gauge bar slidably mounted on said second slide for movement toward and away from said cutting tools, said gauge bar being adapted to be moved into position between the dies of said first and second clamps to thereby control the positioning of the inner ends of workpieces positioned in said clamps preparatory to the effecting of a weld therebetween and the consequent production of said stock, and a double acting cylinder mounted on said second slide for moving said gauge bar in ether direction relative to said tools and second slide.

15. In an electric resistance flash-butt welding machine having a base, a first weld clamp having a current-conductive clamping die longitudinally fixed on said base, a second weld clamp having a current-conductive clamping die slidably mounted on said base for longitudinal movement toward and away from said first clamp, a slide mounted on said base for lateral movement thereon and mounting cutting tools operative to trim weld flash and excess upset metal from opposite sides of welded stock held in said clamps and to clean spatter off the inward directed faces of said dies, and a gauge bar retractably mounted on said slide and adapted to be moved into position between said dies to thereby control the positioning of the inner ends of workpieces moved into said clamps preparatory to the effecting of a weld therebetween and the consequent production of said stock.

16. The construction of claim 9 wherein resilient means yieldably oppose pivotal movement aforesaid of said cutting tools.

References Cited by the Examiner
UNITED STATES PATENTS

| | | | |
|---|---|---|---|
| 2,121,665 | 6/1938 | Hudson | 219—101 |
| 2,203,151 | 6/1940 | Iversen | 219—101 |
| 2,314,656 | 3/1943 | Morton | 29—33 X |
| 2,758,184 | 8/1956 | Seeloff et al. | 219—97 |

RICHARD M. WOOD, *Primary Examiner.*

UNITED STATES PATENT OFFICE
CERTIFICATE OF CORRECTION

Patent No. 3,293,401                      December 20, 1966

Arthur L. Williams et al.

It is hereby certified that error appears in the above numbered patent requiring correction and that the said Letters Patent should read as corrected below.

Column 5, line 66, for "head-fused" read -- heat-fused --; column 7, line 56, for "wedding machine" read -- welding machine --.

Signed and sealed this 12th day of September 1967.

(SEAL)
Attest:

ERNEST W. SWIDER                          EDWARD J. BRENNER
Attesting Officer                               Commissioner of Patents